(12) United States Patent
Al Nashef et al.

(10) Patent No.: US 7,763,768 B2
(45) Date of Patent: Jul. 27, 2010

(54) METHOD FOR THE PREPARATION OF REACTIVE HYDROGEN PEROXIDE IN DEEP EUTECTIC SOLVENTS

(75) Inventors: Inas Muen Al Nashef, Riyadh (SA); Saeed M. Al Zahrani, Riyadh (SA)

(73) Assignee: King Saud University, Riyadh (SA)

( * ) Notice: Subject to any disclaimer, the term of this patent is extended or adjusted under 35 U.S.C. 154(b) by 158 days.

(21) Appl. No.: 12/078,004

(22) Filed: Mar. 26, 2008

(65) Prior Publication Data

US 2009/0012346 A1    Jan. 8, 2009

Related U.S. Application Data

(60) Provisional application No. 60/929,606, filed on Jul. 5, 2007.

(51) Int. Cl.
*A62D 3/11* (2007.01)
(52) U.S. Cl. ........................ 588/316; 588/302
(58) Field of Classification Search .................. 588/316, 588/302; 204/128
See application file for complete search history.

(56) References Cited

U.S. PATENT DOCUMENTS 5,364,508 A * 11/1994 Weres et al. ................. 205/334

* cited by examiner

*Primary Examiner*—Timothy C Vanoy
*Assistant Examiner*—Michelle Hou
(74) *Attorney, Agent, or Firm*—Nixon & Vanderhye P.C.

(57) ABSTRACT

The subject invention provides a potentially economically viable method for the preparation of hydrogen peroxide ($H_2O_2$) in deep eutectic solvents (DES). $H_2O_2$ is then used for the destruction of small to large quantities of sulfur and nitrogen mustards and lewisite, their homologous/analogues, and similar chemical warfare agents at ambient conditions in DES without producing any toxic by-products. Furthermore, $H_2O_2$ has been used for the destruction of small to large quantities of halogenated hydrocarbons, their homologous/analogues, and similar hazardous chemicals at ambient conditions. $H_2O_2$ can be formed by either the electrochemical reduction of oxygen in DES in the presence of water or by dissolving Group 1 (alkali metals) or Group 2 (alkaline earth metals) superoxides, e.g. potassium superoxide, in DES in the presence of water, with/without chemicals used for the enhancement of the solubility of the metal superoxide in the DES, e.g. crown ethers.

15 Claims, No Drawings

METHOD FOR THE PREPARATION OF REACTIVE HYDROGEN PEROXIDE IN DEEP EUTECTIC SOLVENTS

This application claims priority from U.S. Provisional Patent Application No. 60/929,606, filed 5 Jul. 2007, the entire contents of that application is hereby incorporated by reference.

BACKGROUND OF THE INVENTION

1. Field of the Invention

This invention relates to a potentially economically viable method for the preparation of hydrogen peroxide in deep eutectic solvents and its use in the destruction of hazardous chemicals.

2. Background of the Related Art

The invention relates to the production of hydrogen peroxide, a material of commercial importance, which is used in large volumes for bleaching and chemical oxidations. Customary industrial processes for preparing hydrogen peroxide are the electrolysis of acidic ammonium sulfate solutions, the oxidation of isopropyl alcohol and the anthraquinone process. The direct synthesis of hydrogen peroxide from the elements over transition metal catalysts is known, but has not found commercial use to date. There are several reasons for this. For instance, hydrogen and oxygen form explosive gas mixtures if the level of hydrogen in the gas mixture is above 5% by volume. On the other hand, the rate of formation of hydrogen peroxide on using hydrogen-oxygen mixtures outside the explosive range is generally too low to ensure reasonable space-time yields. In addition, an excessively high level of oxygen in the reaction gas can speed up the oxidative degradation of the catalysts. The most common process for production of hydrogen peroxide is the anthraquinone autoxidation process involving alternate hydrogenation and oxidation of one or more anthraquinones or tetrahydro anthraquinones, usually alkyl anthraquinone or alkyl tetrahydro anthraquinone, in a working solution composed of a mixture of organic solvents. The hydrogen peroxide formed is usually recovered by extraction with water to form an aqueous solution. The process is described extensively in the literature, for example in Kirk-Othmer, "Encyclopedia of Chemical Technology", Vol. 13, "Hydrogen Peroxide", Online Posting Date Aug. 17, 2001.

The anthraquinone autoxidation process is very efficient but it is difficult to avoid impurities from the working solution to be extracted together with the hydrogen peroxide. Further, concentrating the aqueous solution of hydrogen peroxide by for example evaporation is energy consuming and accumulates impurities with low volatility, and purification by distillation requires even more energy.

U.S. Pat. No. 7,195,748 disclosed a process for the production of hydrogen peroxide by the anthraquinone process, comprising a hydrogenation stage, an oxidation stage and an extraction stage. According to the invention, catalytic hydrogenation of anthraquinone derivatives dissolved in a working solution is carried out in the presence of added molecular oxygen.

U.S. Pat. No. 3,761,580 discloses production of very pure aqueous hydrogen peroxide solutions by stripping of hydrogen peroxide from the working solution, condensing the resulting vapors containing a mixture of hydrogen peroxide and organic solvents and extracting the condensed vapors to give an aqueous hydrogen peroxide solution.

U.S. Pat. No. 4,824,609 discloses purification of working solution by extraction with carbon dioxide, while U.S. Pat. No. 4,668,436 discloses purification by extraction with a non-cyclic hydrocarbon. Purification of hydrocarbon fluids by extraction with various ionic liquids has been disclosed in, for example, WO 01/40150 and S. Zhang et al, "Extractive Desulfurization and Denitrogenation of Fuels Using Ionic Liquids", Ind. Eng. Chem. Res. 2004, 43, op. 614-622. M. Seiler et al, "Hyperbranched polymers: new selective solvents for extractive distillation and solvent extraction", Separation and Purification Technology 30 (2003) 179-197, discloses use of hyper branched polymers for extractive distillation and solvent extraction.

U.S. Pat. No. 7,157,071 discloses a process for the production of hydrogen peroxide from hydrazine hydrate or hydrazine salt, represented by a general formula: $N_2H_4nX$, wherein, X is $H_2O$, $H_2SO_4$, $HNO_3$, HCl, HBr, HI or $CH_3COOH$; n is 0.5, 1 or 2; N is nitrogen; H is hydrogen; S is sulfur; Cl is chlorine; Br is bromine; and I is iodine, by its liquid phase oxidation with oxygen, using a solid catalyst comprising palladium but with or without halogen promoter, in an aqueous reaction medium with or without comprising a mineral acid and/or halide anions, U.S. Pat. No. 7,144,565 disclosed a process for the direct catalytic production of aqueous solutions of hydrogen peroxide from hydrogen and oxygen in the presence of a small amount of one or more water soluble organic additives (about 0.1-10% by weight). Suitable catalysts include nanometer-sized noble metal catalytic crystal particles. The catalyst particles preferably have a controlled surface coordination number of two to increase the selectivity of hydrogen peroxide production. The water-soluble additive(s) increases catalytic activity causing significant increases in the apparent first order reaction rate-constant for the direct production of aqueous hydrogen peroxide.

U.S. Pat. No. 7,105,142 described a process for the production of hydrogen peroxide from hydrogen and oxygen in a reaction solvent containing a halogenated promoter and/or an acid promoter, in the presence of a heterogeneous catalyst based on one or more metals of the platinum group, wherein the reaction solvent consists of: (1) an alcohol or mixture of alcohols; (2) an aliphatic ether having general formula (I); and (3) optionally water. The solvent mixture may also contain one or more $C_5$-$C_{32}$ hydrocarbons. The process operates under high safety conditions with a high productivity and molar selectivity towards the formation of $H_2O_2$. The methods described above for generating hydrogen peroxide suffer from several disadvantages and are not appropriate for all applications. Consequently, other methods for generating hydrogen peroxide are desired.

Superoxide is a reactive oxygen species formed by the one electron reduction of oxygen, has a longer life time than singlet oxygen and is capable of decolorizing (bleaching) stains and killing bacteria. Throughout this application, superoxide is represented as $O_2.^-$ based on common literature practice.

U.S. Pat. No. 5,663,475 disclosed a method and reactor for oxidation of petrochemicals using ozone and hydrogen peroxide as a replacement for the incinerator that is usually used.

Superoxide is very reactive in aqueous solutions and protic solvents. The rate constant for $O_2.^-$ reaction with $H_2O$ is $1 \times 10^7$/mol/sec (Sawyer, et al., 1981). On the other hand, $O_2.^-$ is quite stable in aprotic solvents. In general, $O_2.^-$ behaves as an oxidant, and as a strong nucleophile, depending on the solvent, in particular on the pH or presence of an easily abstractable hydrogen atom. Superoxide also acts as a one-electron reductant of metal ions and complexes.

Superoxide ion has been known by chemists as long as 1934 when Haber and Weiss (Haber, F. and Weiss, J. *Proc. R. Soc.*, 1934, A147, 332) have proposed that $O_2.^-$ is formed in the decomposition of hydrogen peroxide and in the oxidation of ferrous ions by dioxygen in aqueous solutions. Sawyer and co-workers (Merritt, M. V. and Sawyer, D. T. *J. Org. Chem.* 1970, 35, 2157. Sugimoto, H.; Matsumoto, S.; and Sawyer, D. T. *Environ. Sci. Technol.*, 1988, 22, 1182.)

pioneered work on superoxide ion, particularly the direct electrochemical reduction of dissolved oxygen gas in aprotic solvents to form $O_2.^-$ according to the following reaction $$O_2 + e^- \rightarrow O_2.^- \quad (1)$$

A comprehensive review of superoxide ion chemistry is given by Sawyer et al. (Sawyer, D. T., Sobkowiaand, A. k, and Roberts, J. L. *Electrochemistry for Chemists*, 2nd ed., chapter 9, Wiley Interscience: New York, 1995.). Superoxide ion can be formed directly from solvation of $KO_2$ in aprotic solvents, or electrochemically via direct cathodic reduction of dioxygen (typically E=−1.0V vs SCE). $O_2.^-$ is a strong nucleophile and disproportionates in water to $O_2$ and hydroperoxide:

$$2\,O_2.^- + H_2O \rightarrow O_2 + HOO^- + HO^- \quad (2)$$

To avoid this reaction, generation and utilization of $O_2.^-$ must be done in aprotic solvents. Acetonitrile (MeCN), dimethyl formamide (DMF) and dimethyl sulfoxide (DMSO) are commonly used. Che et al. (Che, Y.; Tsushima, M.; Matsumoto, F.; Okajima, T.; Tokuda, K.; and Ohsaka, T. *J. Phys. Chem.* 1996, 100, 20134.) studied the water-induced disproportionation of the electrogenerated superoxide ion in MeCN, DMF, and DMSO media containing various concentrations of water using UV-vis spectroscopy. In dipolar aprotic solvents superoxide ion is quite stable, because disproportionation to give the peroxide dianion ($O_2^{2-}$) is highly unfavorable (Sawyer, D. T. *Oxygen Chemistry*; Oxford University Press: New York, 1991. Afanas'ev, I. B. *Superoxide Ion: Chemistry and Biological Implications*; CRC Press: Boca Raton, Fla., 1989; Vol. 1). However, the addition of acidic substrates (HA), which act as a Brønsted acid, to stable solutions of $O_2.^-$ in aprotic solvents accelerates the disproportionation, depending on the protic strength (acidity) of HA.

Tang et al. (Chem. Comm., 1345-1347 (2005)) described a method for the electrosynthesis of hydrogen peroxide in an ionic liquid and an in situ epoxidation of alkenes using the generated $H_2O_2$.

A deep eutectic solvent (DES) is a type of ionic solvent with special properties composed of a mixture which forms a eutectic with a melting point much lower than either of the individual components. The first generation eutectic solvents were based on mixtures of quaternary ammonium salts with hydrogen donors such as amines and carboxylic acids. The deep eutectic phenomenon was first described in 2003 for a 1 to 2 by mole mixture of choline chloride (2-hydroxyethyl-trimethylammonium chloride) and urea. Choline chloride has a melting point of 302° C. and that of urea is 133° C. The eutectic mixture however melts as low as 12° C.

This DES is able to dissolve many metal salts like lithium chloride (solubility 2.5 mol/L) and copper(II) oxide (solubility 0.12 mol/L). In this capacity, these solvents could be applied in metal cleaning for electroplating. Because the solvent is conductive, it also has a potential application in electropolishing. Organic compounds such as benzoic acid (solubility 0.82 mol/L) also have great solubility and this even includes cellulose (filtration paper). Compared to ordinary solvents, eutectic solvents also have a very low VOC and are non-flammable.

Other deep eutectic solvents of choline chloride are formed with malonic acid at 0° C., phenol at −40° C. and glycerol at −35° C.

Compared to ionic liquids that share many charactistics but are ionic compounds and not ionic mixtures, deep eutectic solvents are cheaper to make, much less toxic and sometimes biodegradable.

WO 2002 026381 disclosed an invention related to DES and methods for their preparation. In particular, the invention relates to ionic compounds comprising hydrated metal salts, which are liquid at low temperatures, generally below about 100° C.

WO 02/26701 A2 disclosed a method for the synthesis of DES compounds with a freezing point of up to 100° C. by the reaction of one amine salt (I), such as choline chloride with an organic compound (II) capable of forming a hydrogen bond with the anion of the amine salt, such as urea, wherein the molar ratio of I to II is from 1:1.5 to 1:2.5. The DES compounds are useful as solvents, and electrolytes for example in electroplating, electrowinning, electropolishing, and as catalysts.

WO 00/56700 disclosed a method for the synthesis of DES having a melting point of no more than 60° C., formed by the reaction of a quaternary ammonium compound or a mixture of two or more thereof; with a halide of zinc, tin or iron, or a mixture of two or more thereof.

We were the first to show that a stable superoxide ion can be generated in ILs [AlNashef et al. Ph. D. Dissertation, 2004]. We also showed that hexachlorobenzene could be destroyed by the reaction of the superoxide ion generated in selected ILs. However, the superoxide ion reacted with the cation of the IL wasting part of the solvent and producing undesired byproducts and hence, reducing the efficiency of the process.

U.S. Pat. No. 5,663,475 disclosed a method and reactor for oxidation of petrochemicals using ozone and hydrogen peroxide as a replacement for the incinerator that is usually used.

From what was mentioned above it is clear that there is a need for a viable method for the production of hydrogen peroxide that is inexpensive, occurs at ambient temperature, and most importantly, benign.

DETAILED DESCRIPTION OF THE INVENTION

The used DES were obtained from Scionix (UK) with a stated purity of 99%. The used halogenated compounds were obtained from different sources, e.g. Sigma-Aldrich, Acros. The stated purity of most of the used substrates was ≧99. All chemicals were used without further purification.

Caution: Some of the halogenated compounds are extremely toxic, therefore trained and authorized persons should be allowed for this type of work. All the reactions must be performed in an efficient fuming hood and full body protection along with respiratory protection is required during the synthesis and handling of these chemicals. To avoid any accident sufficient amount of decontamination solution should be available at working place. Deep eutectic solvent (DES) is a compound, having a freezing point of up to 100° C. formed by the reaction of at least one amine salt of the formula $$R^1R^2R^3R^4N^+X^- \quad (I)$$

with at least one organic compound (II) which is capable of forming a hydrogen bond with $X^-$, wherein $R^1$, $R^2$, $R^3$ and $R^4$ are each independently:—

H, optionally substituted $C_1$ to $C_5$ alkyl, optionally substituted $C_6$ to $C_{10}$ cycloalkyl, optionally substituted $C_6$ to $C_{12}$ aryl optionally substituted $C_7$ to $C_{12}$ alkaryl, or wherein $R^1$ and $R^2$ taken together represent a $C_4$ to $C_{10}$ optionally substituted alkylene group, wherein the term "optionally substituted" means that the group in question may or may not be substituted with at one or more groups selected from OH, SH, $SR^5$, Cl, Br, F, I, $NH_2$, CN, $NO_2$, $COOR^5$, CHO, $COR^5$ and OR$^5$, wherein R$^5$ is a C$_1$ to C$_{10}$ alkyl or cycloalkyl group, wherein the organic compound II is i) urea, acetamide, thiourea, glyoxylic acid, malonic acid, oxalic acid dihydrate, trifluoroacetic acid, benzoic acid, benzyl alcohol, phenol p-methyl phenol, o-methyl phenol, m-methyl phenol, p-chloro phenol, D-fructose, or vanillin;

ii) aniline or a substituted aniline, a C$_1$-C$_6$ aliphatic acid, a C$_1$-C$_6$ hydroxyaliphatic acid, or a dicarboxylic acid of the formula HOOC(CH$_2$)$_n$COOH, wherein n is 0 or 1, acetamide, a phenol or a substituted phenol, an alkylene glycol, citric acid, ethylene glycol, wherein the molar ratio of I to II is from 1:1.5 to 1:2.5;

It was shown in the literature that a stable superoxide ion could be generated in different types of ILs by the electrochemical reduction of oxygen in ILs. [See for example AlNashef et al. Ph. D. dissertation, 2004]. It was also shown that the generated superoxide ion can degrade hexachlorobenzene in the IL 1-butyl-3-methylimidazolium hexafluorophosphate.

However, the superoxide ion reacted with the IL itself and gave degradation products as indicated by the GC/MS analysis [AlNashef et al. Ph. D. dissertation, 2004]. Tang et al. (Chem. Comm., 1345-1347 (2005)) described a method for the electrosynthesis of hydrogen peroxide in an ionic liquid and an in situ epoxidation of alkenes using the generated H$_2$O$_2$. Molecular oxygen is electrochemically reduced in the presence of water to give hydrogen peroxide.

We found that the superoxide ion can be generated by the reduction of molecular oxygen in DES without the use of a supporting electrolyte. The conductivity of DES is comparable to that of most ILs, e.g. the conductivity of Ethaline is 9 mS/cm. The electrochemically generated superoxide ion can be used to destroy small quantities of chlorinated hydrocarbons, their homologous/analogues, and similar chemicals at ambient conditions in DES. In the presence of added amounts water the superoxide ion reacted with water to produce hydrogen peroxide as detected using UV-vis and titration with KMnO$_4$. The previously mentioned process is explained in the following paragraphs:

Cyclic voltammetry (CV) tests were performed in DES with a stated minimum purity of 99%, which were dried overnight in a vacuum oven at 50° C. The presence of a reduction peak showed that the superoxide ion is produced. The presence of the reverse peak (oxidation of the superoxide ion) indicated that the superoxide ion is stable in the studied DES for the duration of the experiment. In the presence of small quantities of water, the reverse peak disappeared indicating the reaction of the superoxide ion with water according to Eq. (2) to give H$_2$O$_2$.

Electrochemistry was performed using an EG&G 263A potentiostat/galvanostat controlled by computer and data acquisition software. The electrode configuration was a glassy carbon working (BAS, 3 mm diameter) and a platinum mesh counter electrode (Aldrich) using Ag/AgCl as a reference electrode (Fisher Scientific).

For the bulk electrolysis experiments a glass cell with a glass frit of medium porosity separating the anode and cathode compartments was initially used (Ace Glass). A reticulated vitreous carbon (BAS) or Pt mesh (Aldrich) was used as a working electrode. The cathode chamber containing DES (≈20 mL) was purged with argon for 20 min. The catholyte was first pre-electrolyzed until the background current fell to ≈1 mA. Then the potential was set to a value of −1.0 V vs. Ag/AgCl while bubbling oxygen into the DES. The solution was stirred with a magnet stirrer for several hours. A sample from the solution was then analyzed using UV-vis spectrophotometer. The presence of a peak at around 250 nm indicated the presence of the superoxide ion in the tested DES. Samples were taken at different times and the peak corresponding to the superoxide ion was seen to increase with time. After electrolysis, diethyl ether was used to extract the products and the remaining reactant from the DES. A sample of the extract was then analyzed with HPLC (Agilent 1100 series) and GC/MS. The GC/MS analysis showed the absence of any degradation products. This means that the superoxide ion does not react with DES and that it can be used for selected applications. The above procedure was repeated after adding about 1 g of de-ionized water to DES. The concentration of electrogenerated hydrogen peroxide was determined by differential pulse voltammetry, based on the oxidation of hydrogen peroxide at a glassy carbon electrode. At certain time intervals during electrosynthesis, typically a 0.1 ml reaction mixture was withdrawn from the electrochemical cell and the hydrogen peroxide content of the reaction mixture was determined by standard titration with KMnO$_4$.

A membrane electrochemical reactor was also used for the production of. The cathode and anode compartments were made of Plexiglas with appropriate openings to accommodate the electrodes and to load and unload solutions. Nafion® membrane of different thickness was used as a separator between the cathode and anode compartments. Nafion® membranes were soaked in a boiling 5M NaOH solution for 2-3 h to get rid of H$^+$ and then in boiling distilled water for about 1 h. In some cases the membrane was soaked with DES for 24 h before being used. The anode and cathode compartments were made of Plexiglas. The outside frames of the reactor were made of either Plexiglas for clear visualization of the reactor contents or from metallic alloy with proper grooves to accommodate electrical heating elements. Silicon rubber gaskets were used for leak prevention. H$_2$O$_2$ A gas sampling bag, Tedlar®, had been used for the collection of evolved gaseous products from the reactor. The gaseous products and the sample drawn from the reaction mixture were analyzed for the identification of volatile and non-volatile products monitored by GC/MS. The gaseous contents in the sampling bags were analyzed as such by GC/MS using gas tight syringe, the analysis results showed that no degradation products were formed.

The electrochemical process was relatively slow, in addition, the power needed for this process is relatively high and with the increase of the cost of oil this may render the process uneconomical for the production of large quantities of H$_2$O$_2$. Fortunately, we found that the superoxide ion can be generated by dissolving Group 1 (alkali metals) or Group 2 (alkaline earth metals) superoxides, e.g. potassium superoxide in DES without the need to use any additional chemicals which are usually used to enhance the solubility of these metal superoxides in aprotic solvents, e.g. crown ethers. In addition, increasing the temperature to about 50° C. increases the solubility of said superoxides drastically. The presence and stability of the superoxide ion in the tested DES were checked using UV-vis spectrophotometer (Shimadzu). It is well known that the superoxide ion has a peak at around 250 nm. It is also known that the wavelength of this peak the superoxide ion disproportionated to give H$_2$O$_2$ as indicated by titration with KMnO$_4$. The generated H$_2$O$_2$ was used for the destruction of chlorinated hydrocarbons as explained hereafter: A weighed amounts of a chlorinated hydrocarbon and water were added to about 20 g of DES. The solution was mixed vigorously. After enough time, a sample from the solution was withdrawn and analyzed using HPLC and the resulting peak was compared to the peak of the corresponding chlorinated hydrocarbons in pure organic solvent, e.g.

acetone. Then small weighed amounts of the metal superoxide, e.g. potassium superoxide, were added to the solution under vigorous mixing. Samples were then taken and analyzed using HPLC until no peak for the chlorinated hydrocarbon compound is detected. The solution was then extracted using a proper solvent, e.g. diethyl ether, and the sample was analyzed using GC/MS. No peaks were detected for chlorinated hydrocarbons or any known degradation products. Samples from the solution before extraction by ether were dissolved in water and analyzed using electro-spray ionization mass spectrometer. KCl salt was formed, as confirmed by electro-spray ionization mass spectrometry. Electro-spray ionization mass spectrometry confirmed also the presence of the bicarbonate anion in all cases. During the reaction, samples of the gases evolved from the reaction were collected using gas sampling bags, Tedlar®. The samples were then analyzed using GC/MS. No gaseous products, other than water vapor, were detected.

What is claimed is:

1. A method for the preparation of reactive hydrogen peroxide ion in deep utectic solvents by the electrochemical reduction of oxygen in the deep eutectic solvent or mixture of deep eutectic solvents; in the presence of small quantity of water (less than 10 wt %), wherein the deep eutectic solvent (DES) is a compound, having a freezing point of up to 100° C. formed by the reaction of at least one amine salt of the formula $$R^1R^2R^3R^4N^+X^-  \qquad (I)$$

with at least one organic compound (II) which is capable of forming a hydrogen bond with $X^-$,
wherein $R^1$, $R^2$, $R^3$ and $R^4$ are each independently:—
H,
optionally substituted $C_1$ to $C_5$ alkyl,
optionally $C_6$ to $C_{10}$ cycloalkyl,
optionally substituted $C_6$ to $C_{12}$ aryl
optionally substituted $C_7$ to $C_{12}$ alkaryl, or wherein $R^1$ and $R^2$ taken together represent a $C_4$ to $C_{10}$ optionally substituted alkylene group, wherein the term "optionally substituted" means that the group in question may or may not be substituted with at one or more groups selected from OH, SH, $SR^5$, Cl, Br, F, I, $NH_2$, CN, $NO_2$, $COOR^S$, CHO, $COR^5$ and $OR^5$, wherein $R^5$ is a $C_1$ to $C_{10}$ alkyl or cycloalkyl group,
wherein the organic compound II is
i) urea, acetamide, thiourea, glyoxylic acid, malonic acid, oxalic acid dihydrate, trifluoroacetic acid, benzoic acid, benzyl alcohol, phenol p-methyl phenol, o-methyl phenol, m-methyl phenol, p-chloro phenol, D-fructose, or vanillin;
ii) aniline or a substituted aniline a $C_1$-$C_6$ aliphatic acid, a $C_1$-$C_6$ hydroxyaliphatic acid, or a dicarboxylic acid of the formula $HOOC(CH_2)_nCOOH$, wherein n is 0 or 1, acetamide, a phenol or a substituted phenol, an alkylene glycol, citric acid, ethylene glycol,
wherein the molar ratio of I to II is from 1:1.5 to 1:2.5;
b) maintaining the mixture of step a) at a temperature from 10° to 100° C.; and
c) the electrochemical generation of the superoxide ion in the mixture by the reduction of oxygen in the mixture wherein the suoeroxide ion generated in situe will destroy the halogenated hydrocarbons.

2. A method as recited in claim 1, where the superoxide ion is generated by dissolving Group 1 (alkali metals) or Group 2 (alkaline earth metals) superoxides, e.g. potassium superoxide, in deep eutectic solvents in the presence of water of less than 10 wt %.

3. A method as recited in claim 2, where an additional compound, e.g. crown ether, is added to enhance the solubility of metal superoxide in deep eutectic solvents.

4. The method of claim 1, where the mixture is at a pressure of not more than about 1 to 3 atmospheres.

5. The method of claim 1, where the mixture is at a temperature between 10° C. and 100° C.

6. A method as in claim 1, wherein compound II has freezing point of less than 160° C.

7. A method as in claim 1, wherein compound II has a freezing point of 20° C. or less.

8. A method as in claim 1, wherein compound II contains only one type of functional group capable of acting as hydrogen bond donor.

9. A method as in claim 1, wherein the molar ratio of I to II is about 1:2.

10. A method as in claim 1, wherein $R^4$ is a $C_1$ to $C_{10}$ alkyl or a cycloalkyl group, substituted with at least one group selected from OH, Cl, Br, F, I, $NH_2$, CN, $NO_2$, $COOR^5$, $COR^5$, CHO and $OR^5$.

11. A method as claimed in claim 1, wherein $X^-$ is chloride.

12. A method as claimed in claim 1, wherein $R^1$, $R^2$, $R^3$, and $R^4$ are as shown in the following table

| $R^1$ | $R^2$ | $R^3$ | $R^4$ |
|---|---|---|---|
| Me | Me | Me | $C_2H_4OH$ |
| Me | Me | Benz | $C_2H_4OH$ |
| Me | Me | Et | $C_2H_4OH$ |
| Me | Me | Me | Benz |
| Me | Me | Me | $C_2H_4OCOMe$ |
| Me | Me | Me | $C_2H_4Cl$ |
| Me | Me | Me | $ClCH_2CHOHCH_2(R)$ |
| Me | Me | Me | $ClCH_2CHOHCH_2(S)$ |
| Me | H | H | H |
| Me | Me | H | H |
| Et | Et | Et | H |
| Et | Et | Et | Benz |
| Me | Benz | $C_2H_4OH$ | $C_2H_4OH$ |
| Me | H | H | $CH_2COOH$ |
| Me | Me | Me | Et |
| Me | Me | Me | $C_2H_4F$ |
| Me | Me | Me | $Me(CH_2)_{11}M$ |
| Et | Et | Et | Me |
| Et | Et | Et | Benz |
| Me | Me | $C_2H_4OH$ | $C_2H_4OH$ | wherein Me is methyl, Et is ethyl, and Benz is benzyl.

13. A method according to claim 1, in which the amine cation is chiral.

14. A method for the destruction of halogenated hydrocarbons using $H_2O_2$ produced in claim 1.

15. A method for the destruction of sulfur and nitrogen mustards and lewisite, their homologous/analogues, and similar chemical warfare agents using $H_2O_2$ produced in claim 1.

* * * * *